March 25, 1941.  J. D. ROHRDANZ  2,236,070
FISHING ROD HOLDER
Filed Sept. 1, 1939
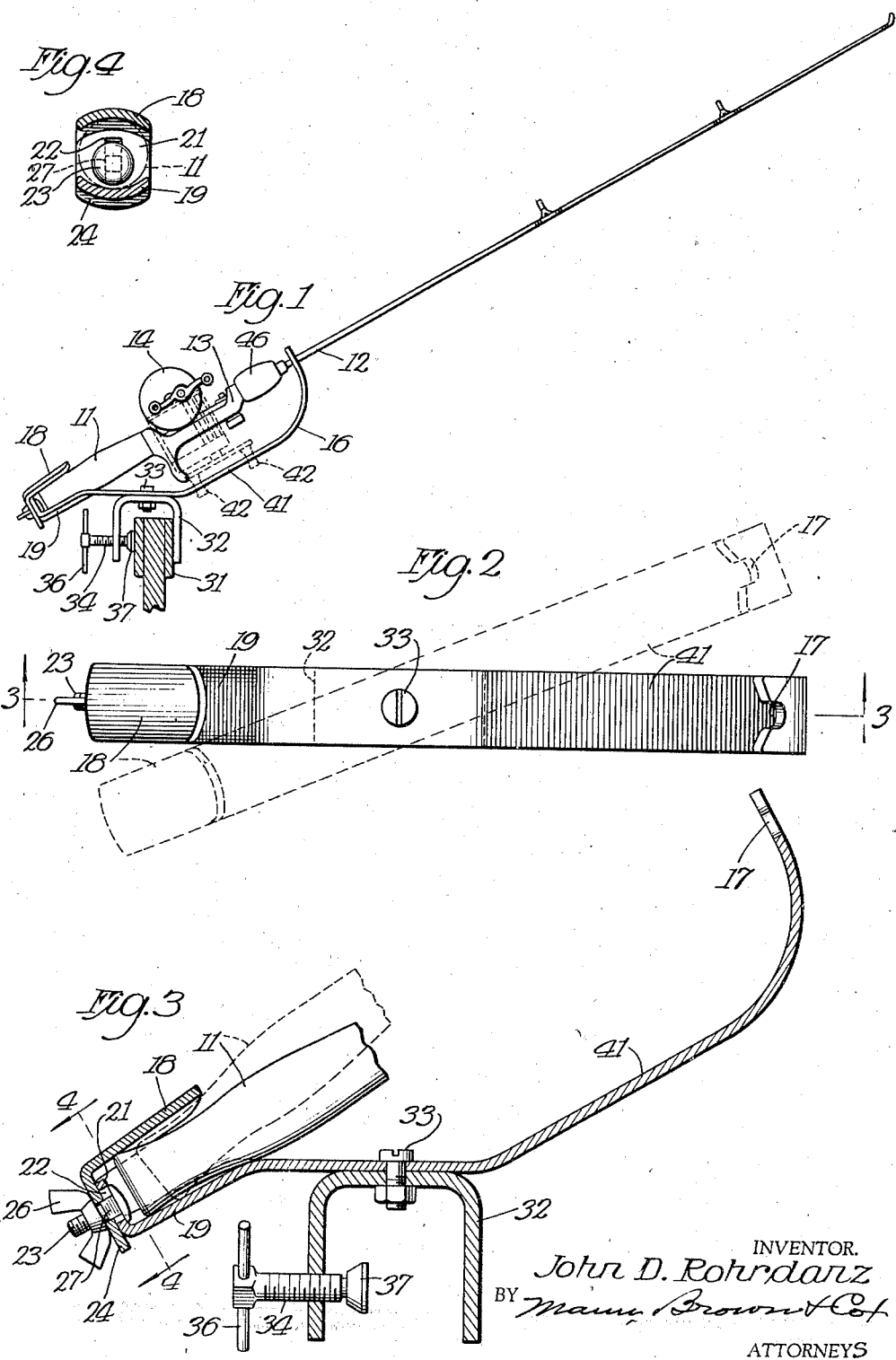
INVENTOR.
John D. Rohrdanz
BY
ATTORNEYS Patented Mar. 25, 1941

2,236,070

UNITED STATES PATENT OFFICE 2,236,070

FISHING ROD HOLDER

John D. Rohrdanz, Harvey, Ill.

Application September 1, 1939, Serial No. 293,012

7 Claims. (Cl. 248—42)

No matter how much a man likes to fish there are times when he does not want to hold the pole continually, or, indeed, when other duties prevent him from doing so. Numerous pole holders have been suggested and a few of them have been put on the market, but it is believed that none are quite satisfactory.

One of the requirements for a pole holder is simplicity. Some of the pole holders suggested have been woefully lacking in this requirement. No matter how satisfactory in function a pole holder may be, it cannot be regarded as commercially satisfactory unless it is simple. Another necessary or highly desirable feature is easy directional adjustability of the pole holder after it has been secured to the boat or other support member. It is undesirable to have to loosen something and tighten it in order to shift the directional position of the pole, i. e. in order to turn it about a vertical axis. Another important consideration is that the pole be easily removed, yet firmly and safely held, and preferably that the same pole holder will fit a wide variety of poles. Another desirable feature which does not appear to have been recognized heretofore is the provision of means for locking the reel so that the line cannot be drawn out by the fish. It is of course desirable that this be accomplished without any extra parts if possible.

An object of the present invention is to provide a fishpole holder which meets these more or less conflicting requirements. It is accomplished in general by providing two main parts, one a clamp and the other a holder, the two being swivelly connected, and each being formed mainly from a single piece of metal for the sake of simplicity. The holder preferably includes an adjustable socket for the fishpole grip, the socket being formed of a single piece of metal together with a thumb nut and screw. The locking of the reel is accomplished by the extremely simple expedient of shaping the holder so that a longitudinal member thereof is in the correct position to engage the handles of the reel if the fishpole is shifted slightly from its normal position.

Additional objects and advantages of the invention will be apparent from the following description and from the drawing, in which:

Fig. 1 is an elevational view of the fishpole holder, showing the application of a fishpole thereto and the attachment of the holder to a support member such as a gunwale of a boat.

Fig. 2 is a plan view of the holder seen in Fig. 1.

Fig. 3 is a sectional view taken approximately on the line 3—3 of Fig. 2.

Fig. 4 is a sectional view taken approximately on the line 4—4 of Fig. 3.

A preferred form of the invention has been chosen for illustration and description, in compliance with section 4888 of the Revised Statutes, but persons skilled in the art will readily perceive other means for accomplishing the same results, and the claims are therefore to be construed as broadly as possible, consistent with the prior art.

The invention has been used with various types of fishing rods and has been illustrated with a fishing rod including a grip portion 11, a pole portion 12, a connecting portion 13, and a reel 14 secured to the connecting portion in any conventional manner.

The holder includes the longitudinal portion 16, which, as seen best in Fig. 2, is bifurcated at its forward end to provide a notch 17 in which the pole portion 12 may rest. Secured to the rear end of the longitudinal portion 16 is an extension or jaw 18 which extends forwardly so as to lie opposite a rear portion 19 of the longitudinal member 16, the portion 19 comprising a second jaw. The jaws 18 and 19 are curved in cross section as seen in Fig. 4 so as to form a socket for the reception of the grip 11. In other words, the edges of the jaws 18 and 19 extend inwardly thereby preventing the grip portion 11 from passing laterally out through the opening between the jaws 18 and 19. The jaws 18 and 19 are adjustably secured together so as to fit a wide variety of grip sizes by the means shown best in Fig. 3. The longitudinal member 16 is provided with an upturned end 21 having a slot 22 therein. A bolt 23 extends through said slot and through a square hole in the end portion 24 of jaw 18, and a thumb nut 26 is screwed onto the bolt 23. The bolt 23 is provided with a flat sided portion 27 which snugly engages the sides of the slot 22 and flat sides of the hole in portion 24, thereby maintaining the jaws 18 and 19 in the desired angular position. In other words, the bolt 23 prevents rotation of the jaw 18 about the axis of the bolt, even when the thumb nut 26 is loosened. Thus, upon loosening the thumb nut 26 the jaw 18 may be slid toward and from the jaw 19 but it may not be swung around with respect to it. Tightening the thumb nut 26 of course locks the jaw 18 in the adjusted position. The enlarged square portion of bolt 23 does not extend all the way through end portion 24 and hence does not interfere with tightening the thumb nut 26.

In order to support the fishing rod holder from a suitable support, such as a gunwale 31 of a boat, a clamp member 32 is provided, being pivotally secured to the longitudinal member 16 by nut and bolt 33 or by a rivet. The bolt is preferably threaded to the clamp 32 so the tension can be adjusted and the bolt locked by the nut. Threaded through one side of the clamp 32 is a screw 34 having a handle 36 on its outer end and a pressure block 37 on its inner end to engage the gunwale 31 and press it against the far side of the clamp 32. It will be observed that the top side of the clamp 32 is relatively flat and that it engages a flat portion of the longitudinal member 16. This gives adequate bearing surface so that there is a minimum of strain on bolt 33 and so that the friction between longitudinal member 16 and clamp 32 will be approximately uniform with various relatively angular positions. The nut and bolt 33 are tightened sufficiently to give considerable resistance to the turning of the longitudinal member 16 so that it will stay in any position to which it is manually turned. The end of the bolt 33 may be peened over to maintain this proper tension.

The longitudinal member 16 has a portion 41 which is not only a vital connecting portion of the holder but is also positioned in a particular place as shown for the purpose of engaging the handles 42 of the reel 14 if the rod is turned over on its side. For the more common fishing rods and reels, the portion 41, which may be called the blocking portion, may satisfactorily be spaced two inches from a straight line extending from the bottom of notch 17 to a bottom portion of the inner surface of jaw 19, it having been found that this distance is suitable for reels of this general type. Of course, for deep sea fishing tackle it may be found necessary to space the blocking portion 41 slightly further from the axis of the rod.

The handle of the fishing rod may be provided with a coil bushing 46 positioned on its forward end portion which is a socket to receive the pole. This bushing should be of the right length to prevent removal of grip 11 from the socket 18—19 until the rod has been raised from notch 17.

Operation

In using the fishing rod support of this invention it is first secured to some suitable support member, such as the gunwale 31 of a boat, by tightening the screw 34. The grip 11 is next thrust into the socket comprising the jaws 18 and 19, and the pole portion is dropped into the notch 17. In this position, even though the grip 11 is not tightly clamped, it will be impossible for a fish to pull the fishing rod out of the holder. In inserting the fishing rod if the jaw 18 is not already properly adjusted, the screw 26 is loosened, and while the rod is held in a forward position, approximately the position shown in dotted lines in Fig. 3, for example, although not tilted upwardly as they are shown, the jaw 18 is allowed to drop or is pressed down and the thumb nut 26 is tightened. This automatically adjusts the socket so that the grip 11 is loose therein in its forward or upper position. However, as can readily be seen in Fig. 3, the jaws 18 and 19 converge toward one another from front to rear so that as the grip 11 is thrust rearwardly into the socket formed by these jaws, it will be wedged between them and be tightly gripped by them. This will hold the rod very firmly and keep it from turning about its own axis and will therefore insure that the reel 14 will be held in the desired position.

If the user desires to lock the reel, it is merely necessary to move the rod longitudinally in an upward and forward direction so as to release the grip from the wedging pressure between the jaws 18 and 19. The rod may then be rotated about its own axis about 90° to the position shown in dotted lines in Fig. 1, at which position the handles 42 are engaged by the blocking portion 41 so that they cannot turn. Of course, the grip 11 is now thrust back down into the socket so that it will be tightly gripped by the jaws 18 and 19.

To remove the rod from the holder it is merely necessary to move it longitudinally in the upward and forward direction, to loosen the grip 11, and then simply lift it out of the holder, raising the forward end first so as to remove the rod from the notch 17 and enable it to clear the bifurcations forming this notch.

While the fishing rod is in the holder, it may at any time be turned to any desired direction by pivoting it on the bolt 33. Because the bolt permanently secures the rod at a suitable elevation, no adjustment for elevation need be provided and hence it is never necessary for the nut and bolt 33 to be tightened enough to render the parts immovable nor is it ever necessary to loosen the nut and bolt 33, since a pivotability of the holder is never objectionable when opposed by considerable friction so that it does not swing freely. Preferably, the friction is enough to prevent it from being swung under the influence of the pull of a fish.

From the foregoing it is seen that a fishing rod holder is provided which in spite of extreme simplicity is thoroughly satisfactory from a functional standpoint, holding the rod firmly and with complete safety, fitting a variety of rods, being adjustable as to direction without the necessity of loosening any parts, and even being so constructed that it can be used for locking the reel.

I claim:

1. A fishing rod holder including a longitudinal member having a forked end adapted to receive a portion of the fishing rod forward of the grip and carrying at its other end an extension adapted to cooperate with the adjacent end of the longitudinal member to hold the end portion of the fishing rod, the extension of the longitudinal member and the adjacent portion of the longitudinal member being disposed opposite to one another normally in rigid relation to one another and curved in cross section to form a socket.

2. A fishing rod holder including a longitudinal member having a forked end adapted to receive a portion of the fishing rod forward of the grip and carrying at its other end an extension adapted to cooperate with the adjacent end of the longitudinal member to clamp the end portion of the fishing rod, an intermediate portion of the longitudinal member being spaced from the axis of the fishing rod a distance appropriate for engaging the handle of a reel conventionally mounted on the fishing rod to block the rotation of the reel handle when desired, the extension of the longitudinal member and the adjacent portion of the longitudinal member being opposite to one another and curved in cross section to form a socket, and converging toward one another from the forward open end of the socket rearwardly so that the end of the fishing rod grip can be wedged into the socket as the forward portion of the rod is rested in the bifurcated forward end of the longitudinal member.

3. A fishing rod holder including a longitudinal member having a forked end adapted to receive a portion of the fishing rod forward of the grip and carrying at its other end an extension adapted to cooperate with the adjacent end of the longitudinal member to clamp the end portion of the fishing rod, the extension of the longitudinal member and the adjacent portion of the longitudinal member being opposite to one another and curved in cross section to form a socket, and converging toward one another from the forward open end of the socket rearwardly so that the end of the fishing rod grip can be wedged into the socket as the forward portion of the rod is rested in the bifurcated forward end of the longitudinal member.

4. A fishing rod holder including a securing unit adapted to secure the holder to some convenient support, and a holder unit pivotally connected thereto including a longitudinal member having a forked end adapted to receive a portion of the fishing rod forward of the grip and carrying at its other end an extension adapted to cooperate with the adjacent end of the longitudinal member to clamp the end portion of the fishing rod, the extension of the longitudinal member and the adjacent portion of the longitudinal member being opposite to one another and curved in cross section to form a socket, adjustably spaced apart to fit a variety of sizes of rod end portions, and converging toward one another from the forward open end of the socket rearwardly so that the end of the fishing rod grip can be wedged into the socket as the forward portion of the rod is rested in the bifurcated forward end of the longitudinal member.

5. A fishing rod holder including a holder unit having a forked end adapted to receive a portion of the fishing rod forward of the grip and a socket at its other end open toward the forked end and with its walls gradually converging rearwardly whereby the butt end of the fishing rod handle may be wedged into the socket to hold the fishing rod firmly while at the same time permitting its ready removal with one hand.

6. A fishing rod holder including a longitudinal member having a forked end adapted to receive a portion of the fishing rod forward of the grip and carrying at its other end an extension adapted to cooperate with the adjacent end of the longitudinal member to clamp the end portion of the fishing rod, the extension of the longitudinal member and the adjacent portion of the longitudinal member being disposed opposite to one another normally in rigid relation to one another and curved in cross section to form a socket; an intermediate portion of the longitudinal member being spaced at such a distance from axis of the socket and fork as to engage the handle of a reel conventionally mounted on a fishing rod carried by the holder to block rotation of the handle when desired, and the space between said intermediate portion and said axis being substantially unobstructed so that rotation of the rod and reel about the axis to position the handle against the intermediate portion will not be obstructed.

7. A fishing rod holder including a holder unit having a forked end adapted to receive a portion of the fishing rod forward of the grip and a socket at its other end open toward the forked end and with its walls gradually converging rearwardly whereby the butt end of the fishing rod handle may be wedged into the socket to hold the fishing rod firmly while at the same time permitting its ready removal with one hand; an intermediate portion of the unit being spaced at such a distance from axis of the socket and fork as to engage the handle of a reel conventionally mounted on a fishing rod carried by the holder to block rotation of the handle when desired, and the space between said intermediate portion and said axis being substantially unobstructed so that rotation of the rod and reel about the axis to position the handle against the intermediate portion will not be obstructed.

JOHN D. ROHRDANZ.